United States Patent

Tommasini et al.

Patent Number: 5,299,476
Date of Patent: Apr. 5, 1994

[54] VERTICAL LATHE

[75] Inventors: Luigino G. Tommasini, Bologna; Roberto Sammartin, Selvazzano Dentro, both of Italy

[73] Assignee: Minganti S.p.A., Bologna, Italy

[21] Appl. No.: 964,053

[22] Filed: Oct. 21, 1992

[30] Foreign Application Priority Data

Oct. 31, 1991 [IT] Italy ............. BO 91 A 000404

[51] Int. Cl.⁵ .................. B23B 7/16; B23B 15/00
[52] U.S. Cl. ................................... 82/122; 82/124
[58] Field of Search ............... 82/120, 121, 122, 124, 82/125

[56] References Cited

U.S. PATENT DOCUMENTS

| | | | |
|---|---|---|---|
| 3,244,037 | 4/1966 | Ruehmer | 82/122 |
| 3,651,958 | 3/1972 | Evans et al. | 82/124 |
| 3,821,835 | 7/1974 | St. Andre et al. | 82/125 |
| 4,317,394 | 3/1982 | Link et al. | 82/124 |
| 4,442,739 | 4/1984 | Swanson et al. | 82/124 |
| 4,597,155 | 7/1986 | Garnett et al. | 82/124 |
| 4,821,612 | 4/1989 | Myers | 82/1.11 |
| 5,031,490 | 7/1991 | Grossmann | 82/124 |
| 5,081,889 | 1/1992 | Takano et al. | 82/122 |

Primary Examiner—William E. Terrell
Attorney, Agent, or Firm—Larson and Taylor

[57] ABSTRACT

Manipulators (M1, M2) capable of gripping a workpiece to be machined are mounted on the tool-carrying slide or slides or on the so-called cross slide or slides (S) of a vertical lathe. The manipulators are preferably located outside the tool stations. The travel movements of the slide or slides are adapted so that, after machining of the workpiece located on the chuck (G) has been completed, a manipulator (M2) is positioned on the chuck in order to take hold of and extract the workpiece, while the other manipulator (M1) is positioned, simultaneously, in a loading station (S1) in order to take hold of and raise a new workpiece to be machined. With successive displacements of the slide or slides, the manipulator (M2) with the machined workpiece is positioned in a station (S2) for receiving and removing the workpiece itself, while the other manipulator (M1) is simultaneously positioned on the chuck (G) in order to insert the new workpiece in the latter.

3 Claims, 3 Drawing Sheets

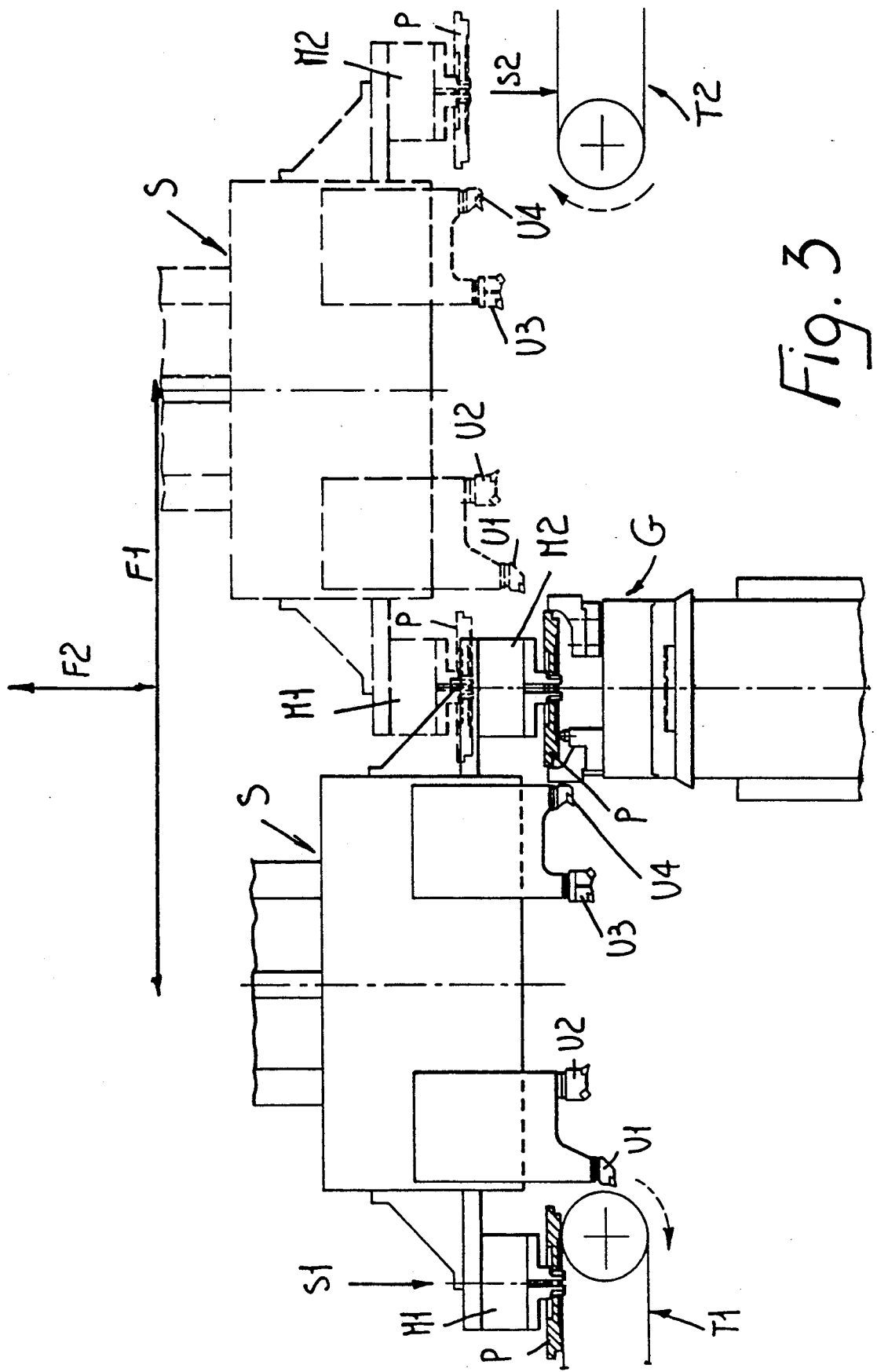

VERTICAL LATHE

FIELD OF THE INVENTION

The invention relates to vertical or so-called carousel lathes, in which the workpiece to be machined is arranged on a table or chuck which rotates on a vertical axis. The tool-carrying slide or slides are mounted on a horizontal guide or cross beam which in turn can be raised and lowered.

BACKGROUND OF THE INVENTION

When several vertical lathes are arranged next to one another to perform the successive machining of identical parts, the workpieces themselves are transferred from one lathe to the next one by so-called portal apparatuses equipped with manipulators movable on horizontal and vertical axes. The operation of these loading and unloading apparatuses is controlled by a computer which dialogues with the lathes. All of these means, intended for feeding and unloading the workpieces from a series of vertical lathes in a cascade arrangement, involve considerable purchase, maintenance and, not least of all, operating costs since the presence of highly qualified personnel is required.

SUMMARY OF THE INVENTION

The invention proposes to overcome the problem of feeding and unloading the workpieces to and from the vertical lathes, whether the latter be used individually or in groups operating in a cascade arrangement, by means of a solution which is more simple and economical than the current solutions and which is based on the following observation. The tool-carrying slide or slides or the so-called cross slides of the lathe are normally connected to the fixed supporting structure of the lathe itself, with the possibility of performing displacements in both the horizontal and vertical direction. The idea has been conceived to dimension these displacements such that the lathe is able to load and unload automatically the workpieces, simply by providing manipulators directly on-board the said tool-carrying or cross slides. After machining of the workpiece has been completed, the tool-carrying or cross slide positions the manipulator which grips and removes the workpiece itself from the chuck and then unloads it, while simultaneously or subsequently, another manipulator mounted on the same slide or on another tool-carrying or cross slide of the same lathe grips a new workpiece to be machined and positions it on the chuck.

BRIEF DESCRIPTION OF THE DRAWINGS

Further characteristic features of the invention and the advantages resulting therefrom will emerge from the following description of a possible embodiment of the invention, illustrated purely by way of a non-limiting example in the figures of the three accompanying illustrative plates, in which:

FIGS. 1, 2 and 3 are front and schematic views of a tool-carrying or cross slide of a vertical lathe provided with manipulators and shown, respectively, during certain stages of machining of a workpiece and during unloading and feeding of the workpiece itself from and to the chuck.

DETAILED DESCRIPTION OF THE PREFERRED EMBODIMENTS

Figure 1:
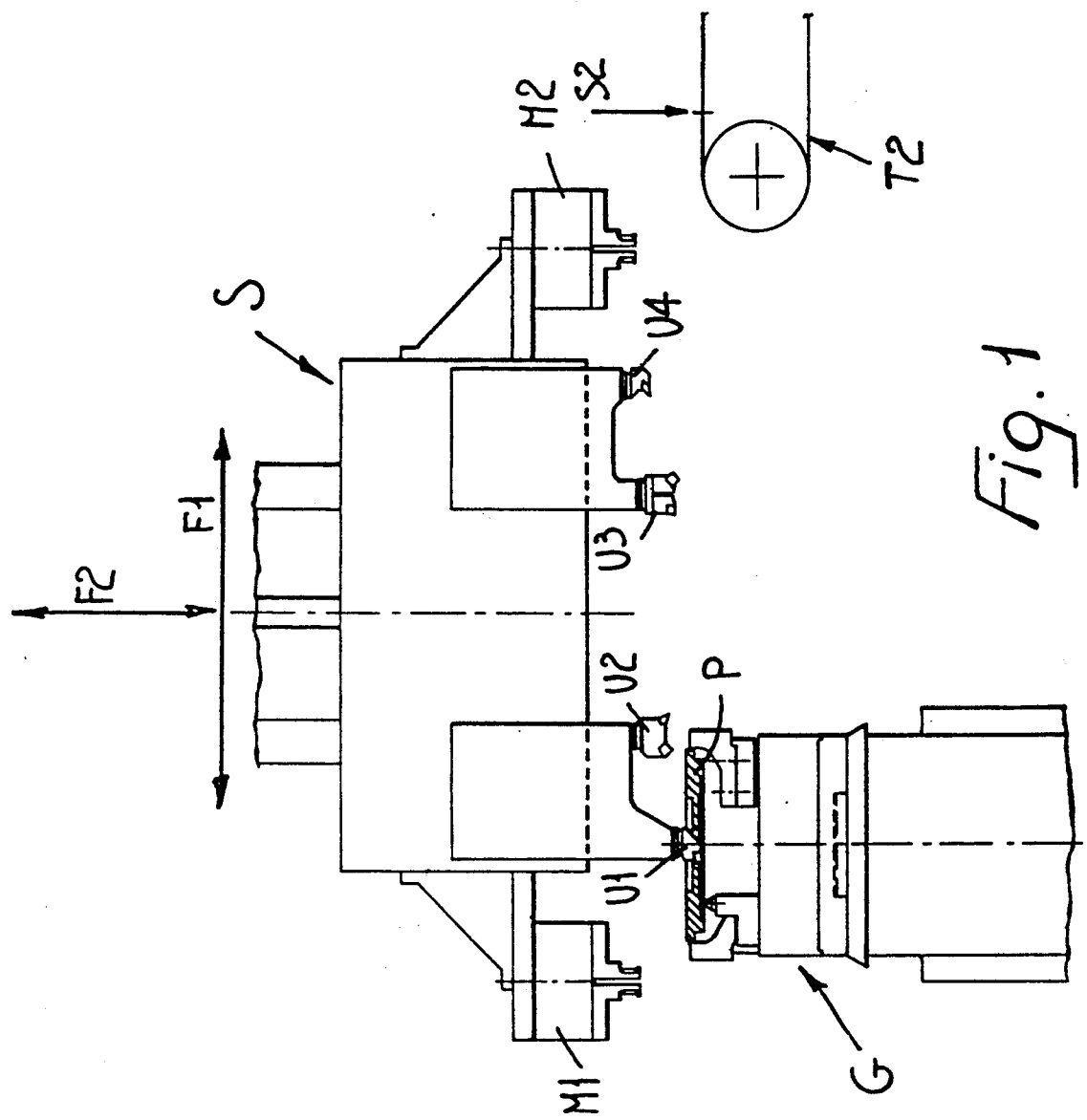

In FIG. 1, S denotes the slide which in the example in question carries four tool stations U1, U2, U3 and U4 and which, by means of guides and slides of the known type, not shown, is able to perform precise displacements which are of significant amplitude also, in both the horizontal and vertical direction, as indicated by the arrows F1-F2. By means of suitable displacements of the slide in the horizontal and vertical direction, the tool stations are progressively used for machining the workpiece P located on the carousel or chuck G with a vertical axis.

According to the invention, the possibility of horizontal displacement of the slide S is adapted, in terms of amplitude, to the new requirements and, if necessary, the means which control the horizontal displacements of the slide itself are programmed so as to perform also rapid approach movements.

On the opposite sides of the slide S there are mounted respective manipulators M1, M2, or grippers, able to grip one of the workpieces P to be machined and able to operate automatically in the manner described below.

On the opposite sides of the lathe are arranged two conveyors T1, T2 equipped with means for supporting the workpieces P and able to perform precise movements such that the supporting means are precisely positioned in the stations S1 and S2 which have a precise spatial location and are located at the same distance from the axis of the chuck G. This distance is the same as the mutual distance between the manipulators M1, M2. When the lathe is machining a workpiece P, a workpiece to be machined is present in the station S1, while the station S2 is empty, waiting to receive the machined workpiece from the lathe.

It is understood that, in place of the conveyors T1 and T2, other known means may be provided, for example a rotating, oscillating or other kind of system.

Figure 2:
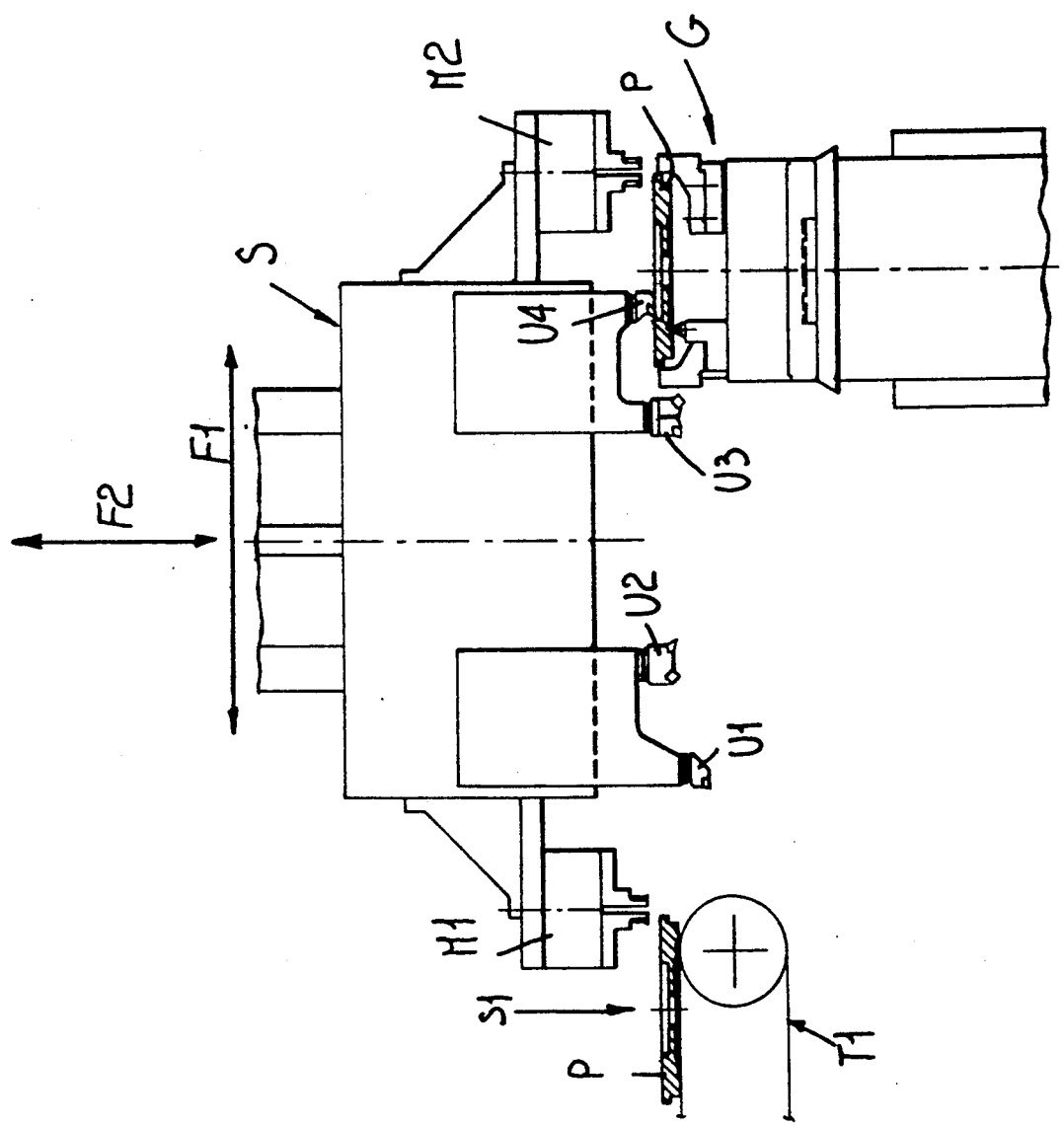

During machining of the workpiece located on the chuck G of the lathe, the slide S moves towards the loading conveyor T1, as can be seen from the sequence shown in FIGS. 1 and 2.

After machining of the workpiece has been completed, the slide S continues its displacement to the left and arranges the manipulator M2 on the machined workpiece, while the manipulator M1 is in the station S1. With successive downward and upward movements of the slide S, the manipulator M2 grips and extracts the machined workpiece from the chuck G, while the manipulator M1 grips and raises the workpiece P to be machined from the station S1, as shown in continuous lines in FIG. 3.

Subsequently, with initially fast and then slow displacements of the slide S in the horizontal and vertical direction, the latter moves into the position shown in broken lines in FIG. 3, such that the manipulator M1 inserts the new workpiece P into the chuck G and the manipulator M2 transfers the already machined workpiece into the station S2 from where the unit T2 removes it and, if necessary, transfers it to a subsequent vertical lathe.

The considerable constructional simplification of the solution described herein is obvious, along with the advantages in terms of efficiency which it brings and the simplicity of implementation of the same, as well as the drastic reduction in maintenance and general costs involved compared to the current feeding and unloading systems mentioned in the introduction of the present description.

It is understood that the manipulators M1 and M2 may be produced in any suitable manner, for example also so as to modify the orientation of the workpiece during loading and/or unloading.

If necessary, also, in particular during handling of small or medium-size workpieces, the manipulators may be mounted on the slide or slides S with the possibility of performing on the latter independent and precise displacements on one or on several axes.

If the lathe is equipped with two tool-carrying or cross slides S, the manipulator M1 will be mounted on one slide and the manipulator M2 will be mounted on another slide.

We claim:

1. A vertical lathe for machining a series of unmachined workpieces comprising:
   a chuck for receiving an unmachined workpiece and for rotating the unmachined workpiece about a vertical axis for machining;
   a feed means for feeding unmachined workpieces sequentially to a pickup station, said pickup station being horizontally spaced from said chuck by a certain distance;
   a removing means for removing machined workpieces from a delivery station after the workpieces are machined on said chuck, said delivery station being horizontally spaced from chuck the certain distance and located on a diametrically opposite side of said chuck from said pickup station such that a straight horizontal travel axis is defined by said pickup station, said chuck and said delivery station with said chuck equidistantly from said pickup station and said delivery station along said travel axis; and
   an elongate slide having a pickup end and a delivery end spaced from said pickup end, said slide being horizontally disposed and movable parallel to the travel axis between a) a first position where said pickup end is vertically adjacent said pickup station and said delivery end is vertically adjacent said chuck and b) a second position where said delivery end is vertically adjacent said delivery station and said pickup end is vertically adjacent said chuck, said slide also being vertically movable and including
   a) a pickup manipulator located at said pickup end of said slide and a delivery manipulator located at said delivery end of said slide with said pickup manipulator and said delivery manipulator being horizontally separated by the certain distance whereby (i) when said slide is in the first position, said slide is moved vertically down and up so that the unmachined workpiece at said pickup station is picked up by said pickup manipulator and at the same time the finished workpiece at said chuck is picked up by said delivery manipulator, and (ii) when said slide is in the second position, said slide is moved vertically down and up so that the finished workpiece picked up from said chuck by said delivery manipulator when in the first position is now deposited by said delivery manipulator to said delivery station and at the same time the unmachined workpiece picked up by said pickup manipulator at said pickup station when in the first position is now delivered by said pickup manipulator to said chuck, and
   b) at least one toolholder provided on said slide between said pickup manipulator and said delivery manipulator, said toolholder receiving a tool by which the unmachined workpiece rotating on said chuck is machined while said slide is stopped at an intermediate position during movement of said slide between the second and first positions.

2. A vertical lathe as claimed in claim 1 wherein said slide includes a plurality of toolholders provided between said pickup manipulator and said delivery manipulator which receive a corresponding tool by which the unmachined workpiece rotating on said chuck is sequentially machined while said slide is stopped at sequential intermediate positions during movement of said slide between the second and first positions.

3. A vertical lathe as claimed in claim 1 wherein at least one of said pickup manipulator and said delivery manipulator is manipulatable independent of said slide to move a picked up workpiece independent of said slide.

* * * * *